United States Patent [19] [11] 4,266,118
Takase et al. [45] May 5, 1981

[54] COOKING CONTROL CIRCUIT FOR COOKING RANGE

[75] Inventors: Akio Takase; Takao Tsutsumi; Hiroaki Tsukahara, all of Gunma, Japan

[73] Assignee: Mitsubishi Denki Kabushiki Kaisha, Tokyo, Japan

[21] Appl. No.: 899,160

[22] Filed: Apr. 24, 1978

[30] Foreign Application Priority Data

Apr. 25, 1977 [JP] Japan .................................. 52/47718
Sep. 20, 1977 [JP] Japan ................................. 52/113116

[51] Int. Cl.³ .............................................. H05B 9/06
[52] U.S. Cl. .................................. 219/492; 364/900; 340/365 F; 219/10.55 B; 219/506
[58] Field of Search ............... 219/10.55 B, 506, 492, 219/480; 340/146, 365 E; 364/900

[56] References Cited

U.S. PATENT DOCUMENTS

| 3,471,789 | 10/1969 | Nutting et al. | 340/365 E |
| 3,911,408 | 10/1975 | Zobel | 364/900 |
| 3,932,723 | 1/1976 | Tamano et al. | 219/10.55 B |
| 3,974,472 | 8/1976 | Gould, Jr. | 219/506 |
| 4,011,428 | 3/1977 | Fosnough et al. | 219/506 |
| 4,034,339 | 7/1977 | Free et al. | 364/900 |
| 4,057,738 | 11/1977 | Nishimura | 340/365 F |

OTHER PUBLICATIONS

"Solid State Controls For Appliances," James Stevens, Appliance Dec. 1976, pp. 30–31.
TMS 1000 Series Support Circuit TMS 1976 JL.NL. "Capacitive-Touch-Keyboard-To-MOS-Interface" 1–1976, Texas Instruments Incorp.

Primary Examiner—B. A. Reynolds
Assistant Examiner—Mark Paschall
Attorney, Agent, or Firm—Wenderoth, Lind & Ponack

[57] ABSTRACT

A plurality of ON-OFF switch type operating keys are connected through respective "AND" gates to an encoder which delivers coded signals as predetermined by the operated keys to a micro-computer where a cooking program is instituted. A switch connected to the control inputs of the "AND" gates is closed to disable the outputs from the operated keys. Alternatively the keys may be arranged in a matrix and connected to an encoder. The keys are scanned with scan signals applied to the matrix from the micro-computer through the normally closed contact of a switch. The switch may be opened to disable the outputs from the operated keys. A cooking range is controlled in accordance with the cooking program.

2 Claims, 4 Drawing Figures 4,266,118

COOKING CONTROL CIRCUIT FOR COOKING RANGE

BACKGROUND OF THE INVENTION

This invention relates to improvements in a control circuit for cooking effected by cooking ranges.

In cooking ranges such as those utilizing high frequency heating, cooking has heretofore been controlled by a mechanically operated timer but, with the latest progress in electronics, electronic circuits have been utilized in many cases to control the cooking effected by these cooking ranges. Particularly the main tendency is increasing use of digital timer circuits with finger contact switches utilizing a micro-computer. The use of such digital timer circuits is advantageous because the control of both the cooking time and the heating power can be precisely accomplished by operating finger contact switch type operating keys but is disadvantageous because, after the particular cooking operation has been started following the completion of the ordering of the program required for that cooking operation, the ordered program disappears when any of the operating keys is contacted by the user or mischievously touched by a child.

It is an object of the present invention to provide a cooking control circuit for a cooking range including a new and improved timer for preventing a program ordered for a particular cooking operation from disappearing from operation due to a mistaken actuation of the operating keys involved.

SUMMARY OF THE INVENTION

This invention provides a cooking control circuit for a cooking range comprising a plurality of operating keys for producing respective contact closure type outputs, a micro-computer receiving the contact closure type outputs from selectively actuated operating keys to institute a program for cooking from the received outputs, a cooking circuit connected to the micro-computer to control the operation of an associated cooking range in accordance with the program from the micro-computer, and a disabling switching means connected so as to optionally disable the contact closure type outputs from the operating keys before the outputs enter the micro-computer.

Preferably, each of the operating keys may be connected to an "AND" gate subsequently connected to an encoder. The encoder delivers coded signals as predetermined by the operated keys to the micro-computer and the disabling switching means includes the "AND" gates, and a disabling switch connected to the control inputs of the "AND" gates.

Advantageously, the plurality of operating keys are arranged into a matrix including a plurality of scan lines and a plurality of output lines connected to the encoder and the disabling switching means includes a gang switch consisting of switch sections each connected in a different one of the scan lines, the micro-computer supplying scan signals to the matrix along the scan lines.

BRIEF DESCRIPTION OF THE DRAWINGS

The present invention will become more readily apparent from the following detailed description taken in conjunction with the accompanying drawings in which.

Throughout the Figures like reference numerals designate identical or similar components.

DESCRIPTION OF THE PREFERRED EMBODIMENTS

Figure 1:
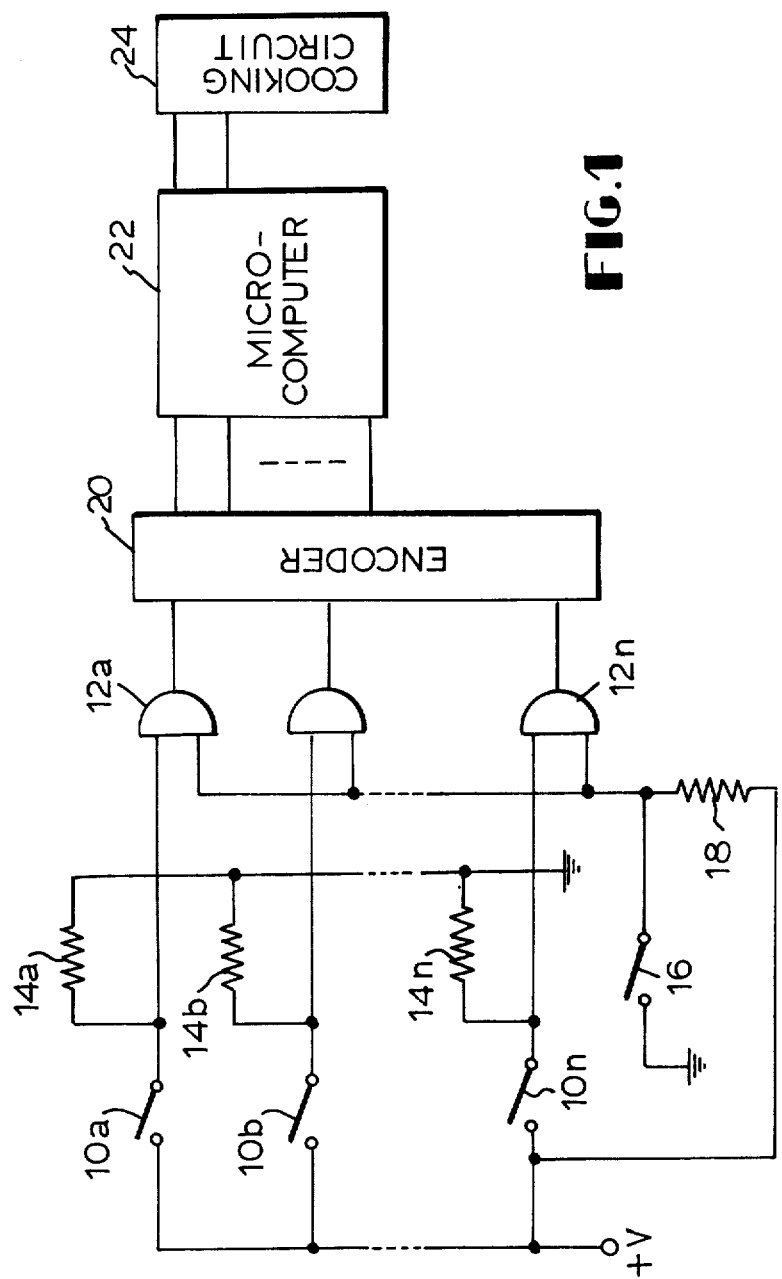
FIG. 1 is a combined wiring and block diagram of one embodiment of the cooking control circuit of the present invention.

Referring now to FIG. 1 of the drawings, there is illustrated a control circuit for a cooking range constructed in accordance with the principles of the present invention. The arrangement illustrated comprises a plurality of operating members shown as normally open switches $10a$, $10b$, ..., $10n$ each having a first terminal connected to an electric source $+V$, and a plurality of "AND" gates $12a$, $12b$, ..., $12n$, each having one input terminal connected to a second terminal of a different one of the operating members $10a$, $10b$, ..., $10n$ and the other or control input terminal connected to a normally open switch 16 subsequently connected to ground.

The second terminal of the operating members $10a$, $10b$, ..., $10n$ are also connected to ground through respective resistors $14a$, $14b$, ..., $14n$ while the other input terminals of the "AND" gates $12a$, $12b$, ..., $12n$ are connected together to a normally open disabling switch 16 subsequently connected to ground, and also to the source $+V$ through a resistor 18.

Then the respective outputs of all the "AND" gates $12a$, $12b$, ..., $12n$ are connected to an encoder 20 subsequently connected to a micro-computer 22 that is, in turn, connected to a cooking circuit 24 for a cooking range (not shown).

When the disabling switch 16 is put into its open position as shown in FIG. 1 the other or control input terminals of all the "AND" gates $12a$, $12b$, ..., $12n$ are maintained in a high voltage state resulting from the source $+V$. Under these circumstances, when selected ones of the operating members $10a$, $10b$, ..., $10n$ are closed, the selected member applies a contact closure type output to the associated "AND" gate to permit the latter to supply a high voltage output to the encoder. The encoder 20 produces coded signals as predetermined by the closed members and delivers them to the micro-computer 22.

The micro-computer 22 assembles the coded signals from the encoder 20 into a program required for the particular cooking operation. Then the cooking circuit 24 is operated to control the operation of an associated cooking range (not shown) in accordance with the program supplied thereto from the micro-computer 22.

On the other hand, when the disabling switch 16 is brought into its closed position, all the "AND" gates $12a$, $12b$, ..., $12n$ have the control inputs maintained in a low voltage state independently of the status of the operating members.

Thus the "AND" gates supply no output to the encoder 20. That is, the states of the operating members are prevented from entering the encoder.

Therefore the disabling switch 16 can be formed by a slide switch (not shown) or the like disposed in a position difficult of access so that the outputs from the operating members are permitted to enter the encoder 20 by maintaining that switch in its open position and that the outputs from the operating members are disabled by maintaining switch 16 in its closed position.

When the disabling switch 16 is maintained in its closed position, any unintentional contact with one or more of the operating members does not affect the operation of the cooking circuit 24 and accordingly, of the cooking range (not shown).

From the foregoing it is seen that the arrangement of FIG. 1 can simply prevent any erroneous or mischievous contact with one or more of the operating members from affecting the operation of an associated cooking range.

Figure 2:
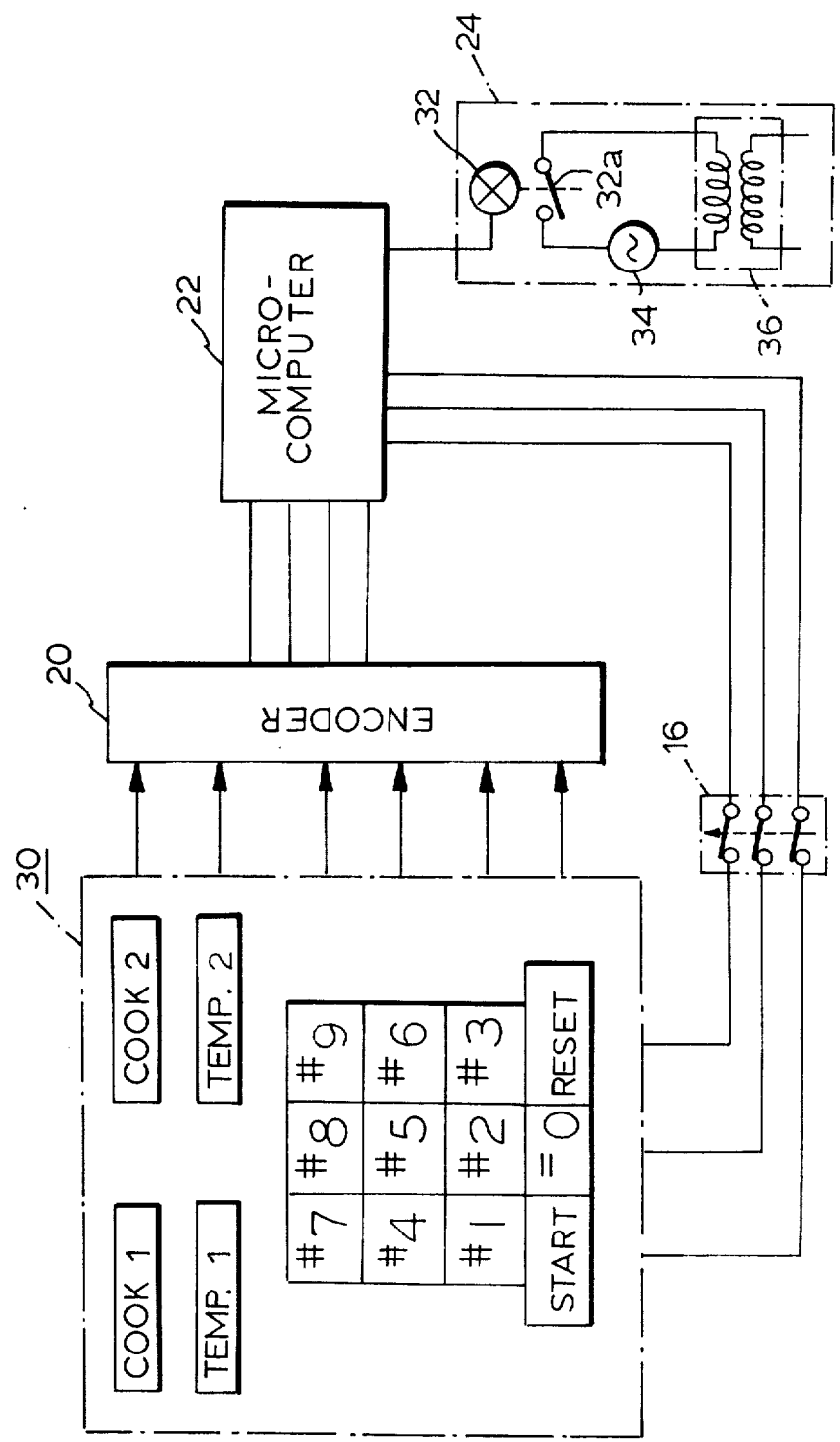
FIG. 2 is a diagram similar to FIG. 1 but illustrating a modification of the present invention.

In the modification of the present invention shown in FIG. 2, a keyboard generally designated by the reference numeral 30 includes four operating members arranged in two rows and two columns and labelled "COOK1", "COOK2", "TEMP1" and "TEMP2" in the upper portion thereof and twelve operating members arranged in four rows and three columns in the lower portion thereof. The members disposed on the lower portion of the keyboard 30 are labelled #0, #1, #2, . . . , #9 "START" and "RESET".

All the operating members are provided with respective operating means such as the operating switches 10a, 10b, etc in FIG. 1 on their underside.

Figure 3:
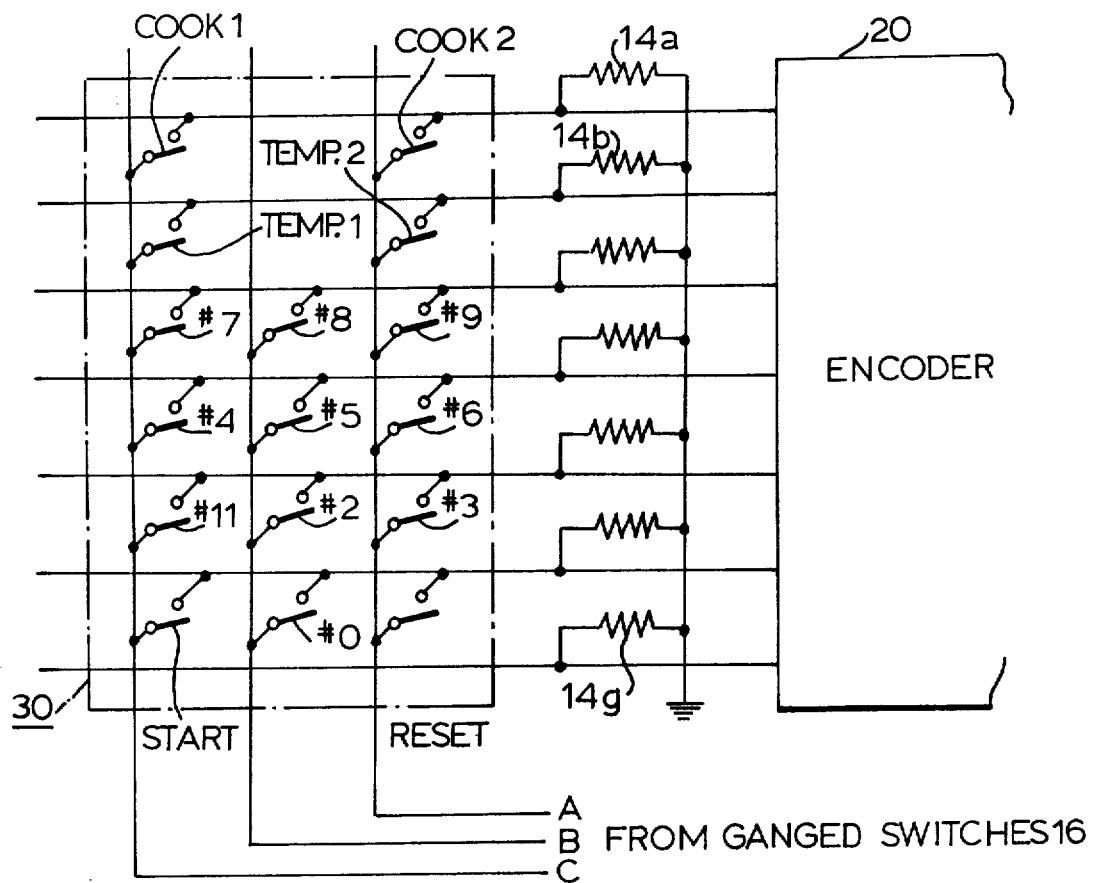
FIG. 3 is a circuit diagram of the details of the keyboard shown in FIG. 2 together with the scan waveforms applied thereto.

Those operating switches are arranged in a matrix including six rows and three columns as shown in FIG. 3. More specifically the six operating switches for COOK1, TEMP1, #9, #4, #1 and START in the leftmost column as viewed in FIG. 3 have one terminal connected to the leftmost column line as viewed in FIG. 3, and the other terminals connected to a first, a second, a third, a fourth, a fifth and a sixth row line numbered from the uppermost row line as viewed in FIG. 3, respectively. Those six row lines and a lowermost row line form output lines which are connected to the encoder 20 and also to ground through respective resistors 14a, 14b, . . . , 14g.

The operating switches #8, #5, #2 and #0 in the middle column have one terminal connected to the middle column line and the other terminals connected to the third, fourth, fifth and sixth row lines, respectfully.

The remaining operating switches for COOK2, TEMP2, #9, #6, #3 and RESET have their two terminals connected in the same manner as those disposed in the leftmost column.

Thus each operating switch is connected to the associated column and row lines adjacent to their intersection.

Three scan waveforms A, B and C, shown in the lower portion of FIG. 3, are applied to the three respective column lines or scan lines also labelled A, B and C from the micro-computer 22 through ganged switches 16 consisting of three normally closed switch sections as illustrated in FIG. 2. As shown in FIG. 3, the scan waveforms A, B and C have a common pulse repetition period and each of these waveforms falls simultaneously with the rise of the next succeeding waveform. The three waveforms A, B and C cyclically scan all the operating switches to enter signals representing their status into the encoder 20.

In order to determine the cooking time of the particular cooking operation, the required ones of the operating switches #0, #1, . . . , #9 are closed. The status of the switches or their ON or OFF state cyclically enters the encoder 20 by means of the scan waveforms A, B and C. In the encoder 20, coded signals are produced as predetermined by the closed switches and delivered to the micro-computer 22 where the cooking time, in this case for the first step of the cooking operation, is calculated. Following this the closure of the operating switch COOK1 causes the micro-computer to program the cooking time.

Thereafter in a process similar to that above described, the cooking time for the second step of the cooking operation is programmed in response to the closure of the operating switch COOK2.

Also the micro-computer 22 similarly calculates the heating power for the first and second steps of the cooking operation in accordance with the selective closure of the operating switches with the numbers and programs them in response to the closure of the operating switching TEMP1 and TEMP2.

Then the micro-computer 22 institutes a program for the duty cycle of the associated magnetron and the time interval of its operation from the time the programs are instituted.

Upon closure of the operating switch START, an output relay 32 disposed in the cooking circuit 24 (see FIG. 2), is picked up in accordance with the last-mentioned program from the micro-computer 22 to close its normally open contacts 32a. This closure of the contacts 32a causes an AC source 34 to supply AC power to the anode electrode of the associated magnetron (not shown) through a transformer 36 resulting in the initiation of the cooking operation.

Upon the completion of the cooking operation, the operating switch RESET is depressed whereupon the arrangement shown in FIGS. 2 and 3 is ready for the next succeeding operation.

As the scan waveforms are supplied to the operating switches through the ganged switches 16, all the operating switches are disabled by opening the ganged switches 16. The arrangement shown in FIGS. 2 and 3 is advantageous over that illustrated in FIG. 1 in that the number of the circuits is smaller as compared with the arrangement of FIG. 1.

Figure 4:
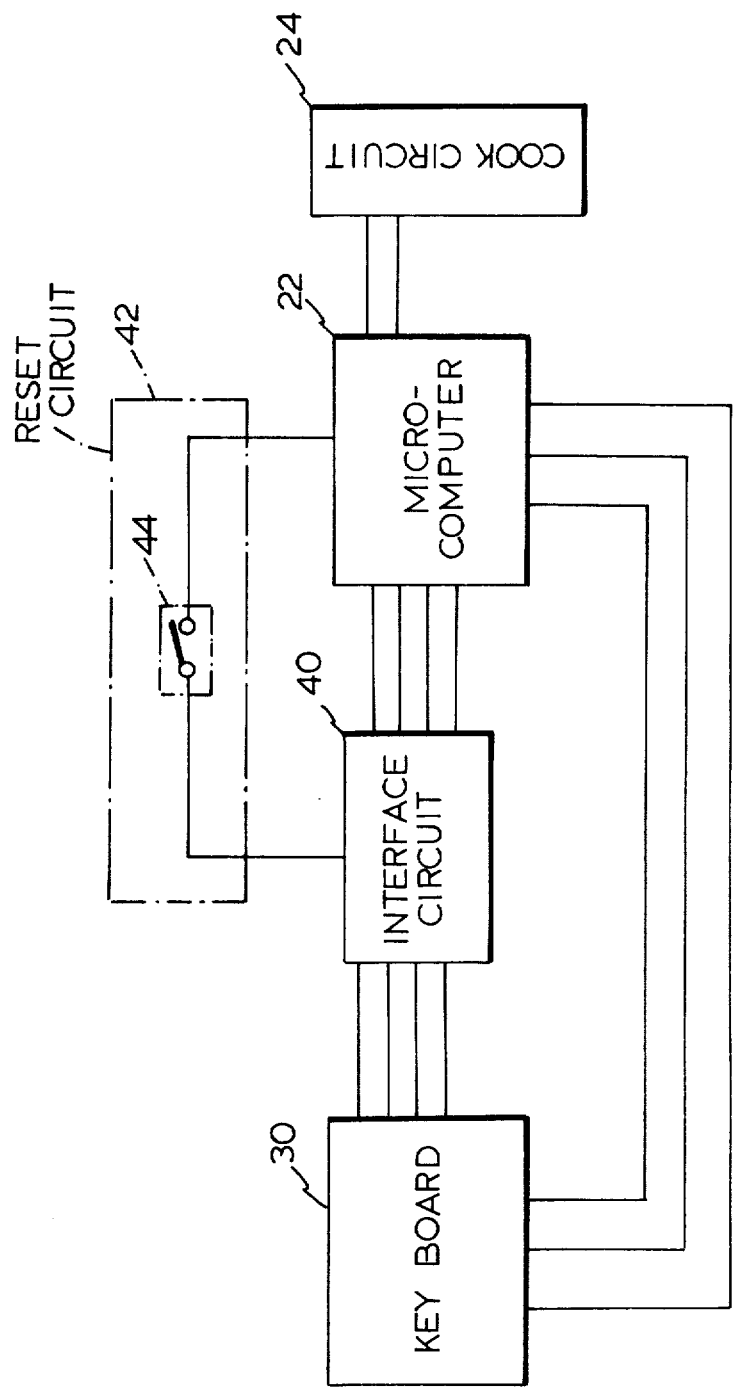
FIG. 4 is a block diagram of another modification of the present invention.

The arrangement shown in FIG. 4 is different from that illustrated in FIGS. 2 and 3 only in that in FIG. 4 an interface circuit 40 is connected between outputs of the keyboard or matrix 30 and the micro-computer 22 and is further connected to the micro-computer 22 through a reset circuit 42 including a normally open switch 44, and the ganged switches 16 are omitted.

The interface circuit 40 includes a holding circuit and an encoder such as described above although the two are not shown for purposes of brevity. The holding circuit receives scan signals in the form of pulses passed through the closed operating switches of the matrix 30 so that, once a first scan signal has been received, this first scan signal is held intact in the holding circuit and thereafter the succeeding scan signals are prevented from entering the interface circuit 40. This is effective for preventing chattering due to the held scan signal.

The scan signal held by the holding circuit supplies a corresponding coded signal to the micro-computer 22 through the encoder as above described. Then the micro-computer 22 institutes a program in accordance with the coded signal.

Following this, micro-computer 22 delivers a reset signal to the interface circuit 40 through the reset circuit 42 having the switch 44 in its closed position. The reset signal resets the holding circuit to permit the latter to receive that scan signal due to the next succeeding closure of a selected operating switch of the matrix 30. The process as described above is repeated to institute the program required for the particular cooking operation.

After the completion of the program, the switch 42 can be put in its open position. This measure prevents the holding circuit in the interface circuit 40 from resetting with the result that the operation of any of the operating switches is prevented from entering a corresponding coded signal into the micro-computer 22.

In summary it is seen that the present invention provides a cooking control circuit including a disabling switching means disposed therein preceding the micro-computer 22 to prevent contact closure type outputs from the operating switches from entering the micro-computer. Therefore once any program is instituted in the micro-computer disruption during the associated cooking operation due to the erroneous operation of any of the operating switches is prevented. Also damage to an unused cooking range due to unintentional operation after unloading is prevented.

Also when the operating switch is formed by a finger contact switch actuatable upon a change in electrostatic capacity, the finger contact surface thereof picks up noise such as electric sparks or the like occurring upon the opening and closing of switches in the surrounding electric devices. This is apt to result in a malfunction of the system. The present invention can prevent this malfunction.

While the present invention has been illustrated and described in conjunction with a few preferred embodiments thereof it is to be understood that numerous changes and modifications may be resorted to without departing from the spirit and scope of the present invention.

What we claim is:

1. A cooking program circuit for a cooking range comprising:

a plurality of operating members disposed in a matrix having a plurality of input scan lines and a plurality of output lines, each of said operating members for producing an output signal on a corresponding output line when manually actuated and when a corresponding input scan line is enabled;

a scanning circuit connected to said plurality of input lines of said matrix for enabling said input scan lines one at a time in turn;

an encoder connected to said plurality of output scan lines and to said scanning circuit for producing an encoded output corresponding to said operating members manually actuated according to said output signals and said input scan line enabled;

a holding circuit connected to said encoder having a reset input, for holding said encoded output corresponding to the last actuated operating member until reset by a reset signal applied to said reset input;

a micro-computer connected to said holding circuit having a reset output, for reading said encoded output held in said holding circuit and producing a reset signal on said reset output and for initiating a cooking program according to said encoded output;

a disabling switch means for selectively connecting or disconnecting said reset input of said holding circuit and said reset output of said micro-computer under manual control, whereby said holding circuit is not reset when said reset input and said reset output are disconnected; and a cooking control circuit connected to said micro-computer for controlling the operation of an associated cooking range according to said program.

2. A cooking control circuit for a cooking range as claimed in claim 1 wherein said operating members are formed by a finger contact switches utilizing an electrostatic capacity.

* * * * *